3,231,377

PHOTOSENSITIVE COMPOSITIONS CONTAINING POLYETHYLENE OXIDE, A PHENOLIC RESIN, AND A PHOTOSENSITIVE COMPOUND AND PROCESS FOR PRODUCING PRINTING PLATES THEREFROM

Barry L. Dickinson, South Branch, and Julius L. Silver, Somerset, N.J., assignors to Union Carbide Corporation, a corporation of New York No Drawing. Filed July 1, 1963, Ser. No. 292,151
22 Claims. (Cl. 96—33)

This application is a continuation-in-part of application Serial Number 41,041, filed July 6, 1960, now abandoned.

This invention relates to photomechanical reproduction and improvement therein. In a particular aspect, this invention relates to photosensitive resin compositions useful for the preparation of continuous tone planographic printing plates.

At the present time virtually all printed copy is produced through the use of three basic types of printing plates. One type is a relief plate which prints from a raised surface. Another type is an intaglio plate which prints from a depressed surface. The third type is the planographic plate which prints from a flat surface which is neither raised above nor depressed below the adjacent and surrounding non-printing area.

Planographic printing plates have water-repellent (hydrophobic), oil-receptive (oleophilic) image area; and water-receptive (hydrophilic) non-image areas. Offset lithography is the most widely known printing method which employs planographic printing plates. One type of lithographic plate is prepared by applying a thin coating of a diazo dye to a suitable support material, exposing the coating to the action of light passing through a negative of the picture to be printed causing the diazo coating to become crosslinked and hence water-repellent and oil-receptive in the image area, and then washing away the unexposed, unreacted coating with a suitable developer. Since the plate support material is itself water-receptive, those portions of the plate from which the unreacted coating has been removed by the developer solution become the non-image area.

On diazo-type lithographic printing plates made as described above, all portions of the image area accept and print the same amount of ink per unit of area, and all parts of the non-image area totally reject the greasy printing ink. Consequently, in order to obtain gradations in tone, or intermediate shades of color or tints, it has been generally necessary to use the so-called "half-tone dot structure" printing plate. In this process the printing plate, and the corresponding picture reproduced therefrom, is broken down into myriad dots by using special photographic half-tone screens during development of the exposed printing plate. While each individual dot prints with the same color intensity, the effect of tones and shades is created by virtue of different sizes of dots in the various parts of the printing plate and the printed picture produced therefrom. The half-tone technique is widely used but it has several disadvantages. In pictures containing regularly repeating or symmetrically disposed elements, the dots frequently form visible moire patterns, i.e., patterns which give a watery or cloudy effect. Color purity is poor and boundaries are ill-defined and not readily controllable. The half-tone dot process is therefore especially unsatisfactory for reproductions of vignettes, tinted areas, and the like. It is impossible to make an exact reproduction of the object or photograph, and there is the further disadvantage that expensive camera accessories are needed to make the screened negatives, and expensive high contrast emulsion photographic films are required for lithographic plates.

There is another planographic printing method, known as Collotype, which is unique among the presently known printing processes in that it provides continuous tone reproduction. In this latter process, the support material for the planographic plates is coated with a photosensitive gelatin which is initially soft and hydrophilic, but which becomes progressively harder and less hydrophilic when acted upon by light. Thus, when the coated plate is exposed to light through a negative, each area of the coating hardens in proportion to the amount of light which it requires and consequently it becomes proportionally less hydrophilic. As a result, the various parts of the exposed coating accept water in an amount inversely proportional to the intensity of light they received, and accept a complementary amount of ink in an amount directly proportional to the intensity of light which has acted upon the area.

Two deficiencies of the Collotype process stem largely from the inherent shortcomings of the photosensitive gelatin itself. Collotype printing plates can be used for only a few thousand reproductions due to the weakness of the gelatin. It is difficult to obtain prints of the same color density throughout a press run because the gelatin absorbs and releases water too rapidly, and the total water absorption capacity of the gelatin, which depends upon a highly critical "tanning" step, is not easily controllable or reproducible.

It is therefore an object of the present invention to provide photosensitive resin compositions useful as photosensitive coatings on planographic plates, which coatings are tougher and more durable than gelatin coatings employed in Collotype continuous tone printing.

It is another object of the present invention to provide planographic printing plates upon which continuous tone exposures can be developed by the use of water.

It is another object of the present invention to provide continuous tone planographic plates which permit control of color density and uniformity of reproduction.

Other objects and advantages of this invention will become apparent from the accompanying description and disclosure.

Accordingly, one or more objects of the present invention are accomplished by the provision of photosensitive compositions which comprises in intimate association (1) a normally solid ethylene oxide polymer, (2) a heat fusible phenolic resin, and (3) a photosensitizing compound which when acted upon by light energy at ambient temperatures yield free radicals capable of reaction with said phenolic resin.

The ethylene oxide polymer component of the compositions is selected from water soluble resinous ethylene oxide polymeric materials having an average molecular weight in the range of from about 50,000 to about 10,000,000, which are readily soluble in water. The term "ethylene oxide polymers" refers to polymers possessing the repeating unit ($CH_2$—$CH_2O$—) as represented by the class of commercial Polyox resins; and the term is intended to include water soluble ethylene oxide polymer resins wherein ethylene oxide is the predominant monomer polymerized therein but which can also contain polymerized residues of other olefin oxides as exemplified by copolymers and terpolymers of ethylene oxide with other copolymerizable monomers containing single epoxide groups such as propylene oxide, butylene oxide, styrene oxide and the like. Poly(ethylene oxide) homopolymer is however preferred as the ethylene oxide polymer resin and shall be used hereinafter as representative of these resins.

The phenolic resin component of the compositions of the present invention are the heat fusible condensation products of a phenol with an aldehyde. Such condensation products are divided into two classes, resoles and novolaks, either of which can be used in this invention as is shown hereinafter. These two types of resins are discussed in order below. Both of these classes of phenolic resins will form in association with ethylene oxide polymers, and a suitable photosensitizing compound, a photosensitive composition and when placed on a support as a thin film and cured, will comprise a planographic printing plate suitable for reproduction in continuous tone for large numbers of faithfully detailed copies.

While these phenolic resins are in the fusible form when making the association product (as hereinafter more clearly set forth) the fusible condition is not necessarily a critical condition of the association product, in which it is possible for a portion or all of the phenolic resin component be fully advanced to the cured state.

The fusible resole phenolic resins can advance upon heating to a degree of cure and polymerization to attain a completely insoluble state. These insoluble phenolics cannot be used in the preparation of the present compositions but are believed to be present in the cured printing plate compositions of this invention. In the preparation of the present compositions only those heat fusible phenolic resins which are soluble in water, alkali or organic solvents such as acetone, ethanol and the like and which are sufficiently fusible to permit admixture and association with the ethylene oxide polymers can be used. These resins include those resole phenolic resins which have not cured to a degree of insolubility as well as the novolak resins discussed below.

RESOLE RESINS

Resole resins are produced by the condensation of phenols and aldehydes under alkaline conditions. Resoles differ from novolaks in that polynuclear methylol-substituted phenols are formed as intermediates in resoles. A resole produced by the condensation of phenol with formaldehyde most likely proceeds through an intermediate having the following illustrated type structure:

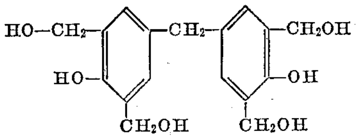

In a typical synthesis, resoles are prepared by heating one mole of phenol with 1.5 moles of formaldehyde under alkaline conditions.

The resole resins are prepared by the condensation of phenol with formaldehyde or, more generally, by the reaction of a phenolic compound, having two or three reactive aromatic ring hydrogen positions, with an aldehyde or aldehyde-liberating compound capable of undergoing phenol-aldehyde condensation. Illustrative of phenolic compounds are cresol, xylenol, ethylphenol, butylphenol, isopropylmethoxyphenol, chlorophenol, resorcinol, hydroquinone, naphthol, 2,2-bis(p-hydroxyphenyl) propane, and the like. Illustrative of aldehydes are formaldehyde, acetaldehyde, acrolein, crotonaldehyde, furfural, and the like. Illustrative of aldehyde-liberating compounds are for example, paraformaldehyde, formalin and 1,3,5-trioxane. Ketones such as acetone are also capable of condensing with the phenolic compounds, as are agents such as hexamethylenetetramine.

The condensation of phenolic compound and aldehyde is conducted in the presence of alkaline reagents such as sodium carbonate, sodium acetate, sodium hydroxide, ammonium hydroxide, and the like. When the condensation reaction is completed, if desired the water and other volatile materials can be removed by distillation, and the catalyst neutralized.

NOVOLAK RESINS

The novolak resins are prepared in a manner similar to that used to prepare the resole resins. The distinguishing exception in this preparation is however that the reaction is conducted in an acidic media, instead of an alkaline media as is the case with the resoles. When less than six moles of formaldehyde are used per seven moles of phenol the products are permanently fusible and soluble. These are the novolak resins. The novolaks have a different structure than the resoles as is illustrated by the novolak condensation products of phenol with formaldehyde:

(a)

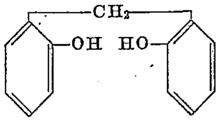

(b)

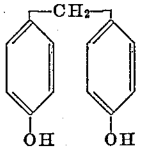

(c)

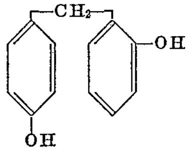

The novolaks can be further reacted with formaldehyde or with a compound such as hexamethylene tetramine, to a state of cure which is similar in the nature to the curing pattern of the resoles.

In a typical synthesis novolaks are prepared by heating one mole of phenol with 0.5 mole of formaldehyde under acidic conditions. The temperature at which the reaction is conducted is generally from about 25° C. to about 175° C.

The reactants which can be used in the preparation of the novolaks are the same as those used in the preparation of the resoles which are described and listed above.

While as previously stated both the resole resins and the novolak resins can be employed in the compositions of the present invention, it is preferred to use the resole resins, as printing plates formed from compositions utilizing them give sharper prints and have a longer printing life.

The most suitable fusible resole resins are those which are insoluble in water but readily soluble in conventional organic solvents such as methyl ethyl ketone, acetone, methanol, ethanol, and the like. Resole resins having a particularly desirable combination of properties are those which have an average molecular weight in the range between about three hundred fifty and six hundred. It is believed that these resole resins contain an average of at least one methylol group per aromatic nucleus.

The photosensitive component of the compositions is selected from the sensitizer agents used in the industry which when acted upon by light energy at ambient temperatures yield free radicals capable of reaction with the phenolic resin component thereby "hardening" or increasing the molecular weight of the resole resin. Suitable sensitizers include the halogenated lower alkyls such as bromoform, iodoform and the like; the water soluble hexavalent chromium compounds such as ammonium dichromate, sodium dichromate and the like; and the diazo, diazonium and azido compounds such as ortho quinone diazide, rosin derivatives of diazonaphthol, azido styryl ketones, 2-methyl-benzene diazonium fluoborate, 1,5 naphthalene tetrazonium fluoborate and the like. Generally applicable are compounds which are halogen sources and which will liberate halogen under the action of light. Such compounds include halogenated paraffins, hydrogen halides, and the like. Among the preferred photosensitizers are the halogen releasing type. Particularly preferred compounds of this class of photosensitizers are alkyl and alkylene iodides. The photosensitizing ability of the various iodides is a function of quantum yield,[1] which in turn depends on the chemical structure of the respective iodides. Generally, the quantum yield increases as the number of iodine atoms in the compounds increases, and as the length of the hydrocarbon chain increases. The quantum yield is also higher if the iodine atoms are on a tertiary carbon atom rather than a primary or secondary carbon atom. On this basis, the photosensitizing ability of various iodides, in the order of increasing efficiency, is exemplified by the following sequence:

$$CH_3I<CH_3CH_2I<CH_3(CH_2)_2I<CH_3(CH_2)_3I<(CH_3)_3CI<CH_2I_2<CHI_3$$

Iodoform is a particularly outstanding photosensitizing agent in the practice of the present invention.

The ratio of components in the photosensitive compositions must be within specific limits in order to obtain satisfactory results when the compositions are employed in the preparation of planographic printing plates. The quantity of poly(ethylene oxide) in the compositions can vary between about 0.3 and 3 parts by weight per part of phenolic resin, with the preferred ratio being between about 0.6 and 1.8 parts of poly(ethylene oxide) per part of phenolic resin. The quantity of photosensitizing agent in the compositions can vary between about 0.08 and 0.2 part by weight per part of phenolic resin, with the preferred ratio being between about 0.1 and 0.13 part of sensitizer per part of phenolic resin. The ratio of these components varies depending on the particular characteristics of the respective components, the presence or absence of fillers and other similar materials, and the particular combination of properties sought in the compositions.

Generally, the photosensitive compositions can be prepared by mixing together the components to form a homogeneous admixture. When the composition is to be applied as a coating on a substrate material in the preparation of a planographic printing plate, the admixture is dissolved in an organic solvent. It is also convenient to dissolve the components in the solvent individually rather than as an admixture. By either method the result is a solution of the photosensitive composition in a solvent medium. Illustrative of solvents suitable for the preparation of the solutions are tetrahydrofuran, dimethylformamide, and the like, and mixtures thereof, acetone, methylethyl ketone, cellosolve, and the like, mixtures thereof and aqueous mixtures thereof. A preferred solvent system is as follows:

| | Percent |
|---|---|
| Cellosolve | 90–50 |
| Methylethyl ketone | 5–30 |
| Water | 5–20 |

Planographic printing plates of the present invention can be prepared by applying the photosensitive composition solution on a supporting base by pouring, spreading, dipping, rolling, or whirlcoating, in a conventional manner. The coating is dried at a moderate temperature (e.g., at 80° C. in a circulating hot air oven) if a water developed image is desired on the plate, however, coatings can be baked at higher temperatures (e.g. about 200° C.) without decline in ability to print but without the ability to form a water developed visable image. The coating may be applied in multiple layers, with each layer being dried before the next one is applied, so as to produce an overall coating of any desired thickness. However, it is one of the advantages of the present invention that excellent planographic plates can be produced with the application of a *single* layer coating.

[1] Quantum yield refers to the number of molecules reacting chemically per photon of light absorbed.

The supporting base can be waterproofed paper, glass, metal plate, metal foil, and the like. The metal plate or foil can be aluminum, steel, zinc, magnesium, copper, chromium, and the like. The planographic printing plates having a grained aluminum or zinc support base have been found to provide excellent printing reproductions.

A particularly interesting and useful aspect of the present invention is the preparation of printing plates without a supporting base. This is accomplished by admixing the components of the photosensitive composition with a reinforcing filler, then homogenizing the mixture on a two-roll mill and compression molding the composition into the form of printing plates. The quantity of filler will generally comprise between about 1 and 30 weight percent of the total composition weight. Suitable inert reinforcing fillers include barium sulfate, calcium carbonate, titanium dioxide, china clay, kaolin clay, fuller's earth, silica, talc, calcium and magnesium silicates, mica, pumice, wood powder, calcite, diatomaceous earth, bauxite, bentonite, and the like. The fillers are added so as to be thoroughly dispersed in the composition before the molding operation. The exposure and developement of these novel printing plates is conducted in the same manner as the printing plates consisting of a coated supporting base.

Another variation in the manufacture of these plates involves forming a film of a composition of this invention by either casting from solution or melt extrudation and then laminating this film to a suitable substrate. This method has some advantages in that it permits the printer to use substrate materials which he desires and most likely has on hand.

The photosensitizing agents can be incorporated into the compositions of the present invention by admixing them with the other ingredients or they may be coated on the surface of the printing plate after it has been formed, thereby sensitizing only the surface of the plate.

When the photosensitizing agent is to be coated on the surface of the preformed plate, it can be applied directly, if liquid, or as a solution in an organic solvent. Application can be made in the same manner that the printing composition can be applied in solution to a substrate as discussed above.

The printing plate is exposed to a light source through a transparent pattern (e.g., a negtive) to form an image on the photosensitive surface. The negative can be either the continuous tone or half-tone type. The light source can be sunlight, carbon-arc light, mercury vapor light and other light sources customarily employed in photographic tracing and in printing work, which is capable of emitting radiation having a wave length in the range of from 1500 A. to 4700 A.

A visible image on the exposed plate is developed by alternate wetting with water and drying when prepared by baking at low temperatures and sensitized with iodoform. If desired, gentle heating can be applied to develop the image and to toughen the coating. The developed exposure usually appears as a continuous tone image with light and dark areas, but in some cases the developed image is not clearly visible until contacted with ink during the printing operation.

It is believed that the image develops due to the fact that each infinitesimal area of the coating hardens in proportion to the amount of light it receives and consequently becomes proportionally less hydrophilic. As in Collotype printing prints, the various parts of the exposed coating accept water in an amount inversely proportional to the quantity of light they receive. These areas accept a complementary quantity of ink directly proportional to the intensity of light which acted upon the coating. Those areas which received no light absorb a maximum quantity of water during development and printing, and completely repel the greasy ink. Those areas exposed to sufficient light to render them completely hydrophobic absorb the maximum amount of ink, and those areas which during exposure received intermediate amounts of light, and absorbed some water during development, accept an intermediate amount of ink in proportion to the intensity of light they received. This mechanism of acceptance and rejection of water and ink proportional to light exposure is assumed to provide the continuous tone nature of the printing plate image and the subsequent reproductions.

As the content of poly(ethylene oxide) in the photosensitive compositions increases, coatings of these compositions tend to be softer but the formation of visual images by exposure and developement occurs quite readily. As the content of the poly(ethylene oxide) in the compositions decreases, visual image formation occurs less readily, but the coatings have the advantage of being tougher and more durable. The characteristics of the coatings are also affected by the particular phenolic resin employed in the photosensitive compositions. For example, it has been found that an advantageous balance of coating durability and good visual image development is obtained with phenol-formaldehyde resin when the ratio of resin to poly(ethylene oxide) resin in the photosensitive composition is from 10:3 to 10:10, with the preferred ratio being approximately in the vicinity of 10:6.7. When meta-cresol-formaldehyde resin is employed, a desirable balance of properties is obtained in the compositions with a ratio of resin to poly(ethylene oxide) resin in the range of 10:3 to 10:7, with the preferred ratio being at approximately 10:6. When resorcinol-formaldehyde resin is employed, a desirable balance of properties is obtained with a ratio of resin to poly(ethylene oxide) resin in the range from 10:15 to 10:30, with the preferred ratio being at approximately 10:18.

Printing plates produced according to the practice of the present invention are capable of providing excellent reproductions in printing processes. The disadvantages of half-tone dot structure techniques described hereinbefore are avoided. The photosensitive compositions of the present invention form coatings on printing plate substrates which are tougher and more durable than the gelatin base coatings heretofore used in continuous tone printing. The invention coating compositions are also more versatile than the gelatin base coatings since the properties of toughness and water-receptivity may be readily and reproducibly controlled simply by varying the weight ratio of poly(ethylene oxide) to phenolic resin component. Furthermore, the invention coating compositions absorb and release water more slowly than does gelatin. These more favorable water absorption characteristics permit easily controllable water capacity and provide improved control of color density during a press run. The invention coating compositions have the advantage that they can be applied by whirlcoating and other conventional methods and dried at moderate temperatures. Further, development of the continuous tone image in the coating after exposure to light requires mere wetting with water, thus eliminating the necessity for special chemicals and the necessity for complicated development techniques which must be rigidly controlled within narrow limits.

While not wishing to be bound by any theory of mechanisms, it is believed that the outstanding characteristics of the photosensitive coating compositions of the present invention as employed in the preparation and use of continuous tone planographic printing plates are mainly due to the "association" or "complex" formation between the phenolic resole resin composition and the poly(ethylene oxide) component. The term "association" refers to the interaction which provides the binding force between the poly(ethylene oxide) component and the phenolic resin component. It is believed that the interaction involves one or more diverse mechanisms such as hydrogen bonding, electrostatic bonding, secondary valence forces, and the like. It appears that the phenomenon concerning hydrogen bonding can best explain the nature of the interaction. The "associating" or "complexing" interaction between the phenolic resin component and the poly(ethylene oxide) component in the photosensitive compositions might be visualized in the following manner:

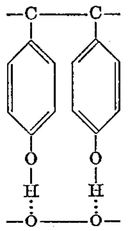

The "association" of the phenolic resin component and the ethylene oxide polymer component causes the formation of a tough, hydrophilic material when coated on a substrate extruded or molded. The water-receptivity of this "association" product declines as the resole phenolic resin "advances," that is, increases in molecular weight and/or in degree of cross-linking on exposure to light. Radicals released by the action of light on the photosensitive substance in the composition (for example, iodine radicals released from iodoform) react with the resole phenolic resin to produce intermediate chemical products. These products presumably react with each other as well as with unactivated phenolic molecules to produce "advanced" high molecular weight phenolic derivatives. This causes the water-receptivity of the phenol-aldehyde resin-poly(ethylene oxide) coating to decline in proportion to the radicals produced, which is in turn proportional to the intensity of the light received by a particular portion of the coating during exposure.

The above-postulated mechanisms of the interaction are merely theoretical and should not be construed as limiting thereto. Other theories or reasons may equally well explain the true nature of the interaction.

The following examples will serve to illustrate specific embodiments of the invention.

Example 1

This example illustrates the preparation of conventional resole resins and novolak useful in the practice of the present invention.

(*a*) *Phenol-formaldehyde fusible resole resin*

A mixture consisting of 1 mole of phenol, 3 moles of paraformaldehyde, 6 moles of water and 0.3 mole of sodium acetate trihydrate is refluxed at atmospheric pressure for a period of time between about two and one-half hours and three and one-half hours until the solution becomes cloudy. Two distinct phases begin to form as the resin precipitates from the refluxing mixture. Heating is continued for an additional five minutes and the hot mixture is then poured into water to completely precipitate the resin. The solid resin is recovered by filtration or decantation or other suitable separation methods and washed thoroughly with water. The resin is dissolved in a suitable solvent such as methyl ethyl ketone, and anhydrous sodium sulfate is added to dry the solution. The water-free solution is recovered by filtering out the sodium sulfate.

(*b*) *Meta-cresol-formaldehyde fusible resole resin*

Meta-cresol, paraformaldehyde and sodium acetate trihydrate in a molar ratio of 1:2.5:0.3, respectively, are mixed in water to form a dilute slurry (about 200 milliliters of water per mole of meta-cresol). This mixture is refluxed at atmospheric pressure until resin begins to precipitate, which is normally about a twenty-minute reaction period. The heating is continued an additional five minutes, and the reaction mixture is poured into cold water to completely precipitate the resin. An anhydrous solution of the resin in methyl ethyl ketone is prepared in the same manner as above.

(*c*) *Resorcinol-formaldehyde fusible resole resin*

A mixture of resorcinol, sodium sulfate and formalin (37 percent solution of formaldehyde in water) in a molar ratio of about 1:0.2:0.8, respectively, is dissolved in water (about 100 milliliters of water per mole of resorcinol). The reaction mixture is heated on a steam bath until the solution turns cloudy, then it is poured into cold water to completely precipitate the resin product. The resin is recovered and prepared as an anhydrous solution in methyl ethyl ketone in the manner described above.

(*d*) *Phenol-formaldehyde novolak resin*

One hundred grams of phenol is dissolved in 69 grams of 37 percent formalin solution and about 0.55 gram of oxalic acid is added. The mixture is refluxed at a temperature of about 80° C. for a period of about 6 hours at the end of which period the solution becomes cloudy. Water is then distilled from the reaction mixture until the temperature of the resinous mass reaches about 150° C. The resin is then discharged from the reaction vessel and allowed to cool. At room temperature the cooled resin is brittle and is readily pulverized to a powdery state.

EXAMPLE 2

This example illustrates the preparation of a photosensitive composition of this invention and its application in continuous tone planographic printing.

Iodoform was added to a methyl ethyl ketone solution containing 0.2 gram per mole of phenol-formaldehyde fusible resole resin (prepared in the manner of Example 1, subdivision *a*) so as to form a solution having a resin to iodoform weight ratio of 10:1. The solution was added to ten volumes of a 1 percent by weight solution of poly(ethylene oxide) resin (molecular weight in the range between four million and eight million) in dimethylformamide. The weight ratio of phenolic resin to poly(ethylene oxide) resin to iodoform in the solution was 10:5:1.

A planographic printing plate was prepared by pouring the solution on a grained zinc plate. Three layers were applied, each layer being dried before the subsequent layer was superimposed. The printing plate was dried in a circulating hot air oven at a temperature of about 70° C. to about 80° C.

The coated surface of the planographic printing plate was contacted with a photographic negative, using a vacuum printing frame to hold the negative against the plate, and the negative and plate were exposed for about ten minutes to light from a carbon arc placed twenty inches from the plate. The negative was removed and the printing plate was mounted on an offset lithographic press (Harris LUH-120). The exposed plate surface was thoroughly wetted with a sponge and the molleton rollers of the press. The wetting produced a continuous tone visual image on the plate.

The inking rollers of the press were contacted with the plate and excellent continuous tone reproductions were printed on paper. The ink employed was a black photogelatin ink commercially available as Pope and Gray Ink No. BB-548-6XD.

Similar reproductions are obtained when bromoform, methylene iodide and other halocarbons are used as sensitizers instead of iodoform.

EXAMPLE 3

A solution of meta-cresol-formaldehyde fusible resole resin (prepared in a manner similar to Example 1, subdivision *b*) and iodoform, equal to about 10 percent by weight of the resin, in methyl ethyl ketone was prepared. A quantity of this solution was added to a 1 percent by weight solution of poly(ethylene oxide) resin (approximate molecular weight in the range between four million and eight million) in dimethylformamide to give a final solution containing A-stage resole resin, poly(ethylene oxide) resin and iodoform in a weight ratio of 10:5:1, respectively. This solution was then applied to the surface of a grained zinc plate to form a photosensitive coating thereon. The plate was exposed, developed and employed in a printing operation in the same manner as Example 2. Excellent continuous tone reproductions were obtained on paper.

EXAMPLE 4

Resorcinol-formaldehyde fusible resole resin (prepared in a manner similar to Example 1, subdivision *c*) and iodoform were dissolved in methyl ethyl ketone, and the resulting solution was added to a 1 percent by weight solution of poly(ethylene oxide) resin (approximate molecular weight in the range between four million and eight million) in dimethylformamide to give a final solution containing A-stage resole resin, poly(ethylene oxide) resin and iodoform in a weight ratio of 10:18:1, respectively. This solution was employed to prepare a photosensitive coating on a grained zinc plate. The plate was exposed, developed and employed in a printing process in the manner of the previous examples. Excellent, commercially acceptable reproductions were obtained.

EXAMPLE 5

This example illustrates the effect on the developed visual image of the quantity of photosensitive substance in a composition coated on a printing plate.

The phenol-formaldehyde fusible resole resin and poly(ethylene oxide) components employed in Example 2 were used to prepare seven photosensitive compositions containing varying amounts of iodoform. Each composition was applied to a grained zinc printing plate in a three-layer coating, and the plates were exposed and developed as described hereinbefore. Table I below lists the ratio of components in the respective compositions and the rating of the developed visible image.

TABLE I

| Fusible resole resin/poly(ethylene oxide)/iodoform | Visible image |
|---|---|
| 1:0.67:0.050 | No image. |
| 1:0.67:0.080 | Fair image. |
| 1:0.67:0.100 | Best image. |
| 1:0.67:0.125 | Good image. |
| 1:0.67:0.157 | Fair image. |
| 1:0.67:0.180 | Poor image. |
| 1:0.67:0.200 | Poor image. |

The development of images readily visible to the naked eye is not an essential prerequisite for good printing. In actual practice, inking of the printing plate causes an excellent visible image to appear on all of these plates. Hence, even through a developed image is not clearly visible, the exposed coating surface has excellent differential water absorption characteristics which are manifested as a strong, clear visible image when the surface is contacted with ink due to a differential ink reception.

EXAMPLE 6

This example illustrates the preparation of photosensitive compositions employing a mixture of phenolic resins as the fusible resole component of the compositions.

Employing the techniques of the previous examples, three photosensitive compositions were prepared, applied on grained zinc plates, exposed through a negative, and developed with water.

The following Table II lists pertinent data relating to the preparations. The phenol resins employed correspond to the respective phenol-formaldehyde, meta-cresol-formaldehyde and resorcinol fusible resole resins illustrated in Example 1. The poly(ethylene oxide) resin component had a molecular weight in the range between four million and eight million. The proportions are in parts by weight.

TABLE II

| Phenol resin | Meta-cresol resin | Resorcinol resin | Poly(ethylene oxide) | $CHI_3$ | Quality of image |
|---|---|---|---|---|---|
| 1 | ---------- | 0.23 | 1 | 0.1 | Good. |
| 1 | ---------- | 0.072 | 0.67 | 0.1 | Do. |
| ----- | 1 | 0.14 | 0.6 | 0.1 | Do. |

A mixture of fusible resole resins has advantages over fusible resole resins employed singly in the photosensitive compositions. Each resole resin of a mixture appears to contribute one or more desirable properties to the composition with the overall result that a superior printing plate is provided. Phenol-formaldehyde and meta-cresol-formaldehyde resins contribute toughness and durability to the photosensitive coating. Resorcinol-formaldehyde resin is highly reactive under sensitizing conditions. Visible image formation is rapid, and a lower resorcinol-formaldehyde resin content is required to give satisfactory results in planographic printing operations. Resorcinol-formaldehyde resin also has the advantage of decreasing the tackiness of a coating.

It was also observed that the photosensitive coatings were toughened when certain additives were included such as resole and novolak resins, trimethylolphenol, epoxy resins plus hardeners, and the like.

EXAMPLE 7

This example illustrates the preparation of photosensitive compositions containing auxiliary toughening additives.

Six photosensitive compositions of this invention having a toughening additive incorporated therein were prepared, coated on support base material, exposed, and developed.

The constituents of the compositions are listed in parts by weight in Table III below. These printing plate coatings exhibited excellent image formation, and the coatings were tougher than the corresponding compositions not containing a toughening additive.

TABLE III

| A-stage resole resin [1] | Poly-(ethylene oxide) [2] | $CHI_3$ | Auxiliary additive |
|---|---|---|---|
| 10 | 6.7 | 1 | Epoxy resin and hardener,[3] 2.7 |
| 10 | 6.7 | 1 | Phenolic varnish,[4] 1.33 |
| 10 | 6.7 | 1 | Phenolic varnish,[4] 2.76 |
| 10 | 6.7 | 1 | 2,4,6-trimethylolphenol, 2.67 |
| 10 | 6.7 | 1 | Resole resin,[5] 2.0 |
| 10 | 6.7 | 1 | Novolak resin,[6] 2.0 |

[1] Phenol-formaldehyde resin as described in Example 1.
[2] Molecular weight in the range between four million and eight million.
[3] Diglycidyl ether of Bisphenol A (10,500–19,500 centipoises) plus hydroxyether diethylenetriamine hardener in a 3 to 1 weight ratio.
[4] Prepared by the condensation of 75 parts of 37 percent formalin with 100 parts of p-phenylphenol catalyzed with oxalic acid.
[5] Prepared by the condensation of 150 parts of 37 percent formalin with 100 parts of phenol catalyzed with barium hydroxide, and neutralization with 1.55 parts of phosphoric acid.
[6] Prepared by the condensation of 70 parts of 37 percent formalin with 100 parts of phenol catalyzed with oxalic acid, and neutralization with calcium hydroxide.

EXAMPLE 8

Thirty grams of powdered poly(ethylene oxide) having an average molecular weight of from about 3,000,000 to about 4,000,000 and 20 grams of phenol-formaldehyde novolak resin (as prepared in Example 1(*d*)) were mixed into a paste with 100 cc. of water and washed on a 2 roll mill at a temperature of about 100° C., until a thin homogeneous sheet could be removed. A sheet of this material was pressed out between flat steel plates to obtain a thin and fairly uniform film. The press platens were set to a temperature of about 100° C. and a pressure of about 300 pounds per square inch. The platens were cooled with ice water temperature to remove the film. The material was then laid on top of a metal substrate for added support.

The plate was coated with a 5 percent solution of iodoform in acetone and exposed through a half tone negative to a 15 ampere carbon arc light source at a distance of about 24 inches for a period of about 5 minutes. The plate was then mounted on a "Multilith" offset press and prints were run off. The prints were of good quality and the plate did not scratch during the run.

What is claimed is:

1. A photosensitive composition comprising in association (1) from about 0.3 to 3.0 parts by weight of a water soluble ethylene oxide polymer having an average molecular weight of from about 50,000 to about ten million, per part of (2) a heat fusible phenolic resin; and (3) from about 0.08 to about 0.2 part by weight per part phenolic resin of a photosensitizing compound, which when acted upon by light energy at ambient temperatures, yields free radicals capable of reaction with said phenolic resin, wherein said photosensitive composition becomes more oleophilic on exposure to light.

2. The composition of claim 1 wherein the photosensitizing compound releases halogen upon exposure to light.

3. The composition of claim 1 wherein the photosensitizing compound is iodoform.

4. The composition of claim 1 wherein said soluble ethylene oxide polymer is poly(ethylene oxide).

5. The composition of claim 1 wherein said phenolic resin is a resole phenolic resin.

6. The composition of claim 5 wherein said resole phenolic resin is the alkaline catalysed condensation resin of phenol and formaldehyde.

7. The composition of claim 5 wherein said resole phenolic resin is the alkaline catalysed condensation resin of cresol and formaldehyde.

8. The composition of claim 5 wherein said resole phenolic resin is the alkaline catalysed condensation resin of resorcinol and formaldehyde.

9. The composition of claim 1 wherein said phenolic resin is a novolak phenolic resin.

10. The composition of claim 9 wherein said novolak phenolic resin is the acid catalysed condensation resin of phenol and formaldehyde.

11. The composition of claim 6 wherein the photosensitizing compound is iodoform.

12. A planographic printing plate which comprises a support base having coated thereon a photosensitive composition comprising in association (1) from about 0.3 to 3.0 parts by weight of a water soluble ethylene oxide polymer having an average molecular weight of from about 50,000 to about ten million, per part of (2) a heat fusible phenolic resin; and (3) from about 0.08 to about 0.2 part by weight per part phenolic resin of a photosensitizing compound, which when acted upon by light energy at ambient temperatures, yields free radicals capable of reaction with said phenolic resin, wherein said photosensitive composition becomes more oleophilic on exposure to light.

13. The planographic printing plate of claim 12 wherein said support base is aluminum.

14. A photographic process which comprises coating a supporting surface with a continuous film comprising (1) from about 0.3 to 3.0 parts by weight of a water soluble ethylene oxide polymer having an average molecular weight of from about 50,000 to about ten million, per part of (2) a heat fusible phenolic resin; and (3) from about 0.08 to about 0.2 part by weight per part phenolic resin of a photosensitizing compound, which when acted upon by light energy at ambient temperature, yields free radicals capable of reaction with said phenolic resin, and acting upon said film with light of selected intensity in accordance with an image.

15. A photographic process which comprises exposing a film of a photosensitive composition comprising (1) from about 0.3 to 3.0 parts by weight of a water soluble ethylene oxide polymer having an average molecular weight of from about 50,000 to about ten million, per part of (2) a heat fusible phenolic resin; and (3) from about 0.08 to about 0.2 part by weight per part phenolic resin of a photosensitizing compound, which when acted upon by light energy at ambient temperature, yields free radicals capable of reaction with said phenolic resin, to light of selected intensity in accordance with an image and developing the exposed film with water.

16. A photographic process which comprises exposing a film of photosensitive composition comprising (1) from about 0.3 to 3.0 parts by weight of a soluble ethylene oxide polymer having a molecular weight of from about 50,000 to about ten million, per part of (2) a heat fusible resole phenolic resin; and (3) from about 0.08 to about 0.2 part by weight per part phenolic resin of a photosensitive compound, which when acted upon by light energy yields free radicals capable of reacting with said phenolic resin, to light of selected intensity in accordance with an image and developing the exposed film with water.

17. A photographic process which comprises exposing a film of a photosensitive composition comprising (1) from about 0.3 to 3.0 parts by weight of a soluble ethylene oxide polymer having a molecular weight of from about 50,000 to ten million, per part of (2) a novolak resin; and (3) from about 0.08 to about 0.2 part by weight per part phenolic resin of a photosensitizing compound, which when acted upon by light energy at ambient temperatures yields free radicals capable of reaction with said phenolic resin, to light of selected intensity in accordance with an image and developing the exposed film with water.

18. The planographic printing plate of claim 12 wherein the said photosensitizing compound is coated on the surface of the ethylene oxide polymer and phenolic resin in association.

19. A photosensitive composition comprising in association (1) from 0.6 to 1.8 parts of a water soluble ethylene oxide polymer having an average molecular weight of from about 50,000 to about ten million per part of (2) a heat fusible phenolic resin; and (3) from 0.08 to 0.2 part per part phenolic resin of a photosensitizing agent, which when acted upon by light energy at ambient temperatures, yields free radicals capable of reaction with said phenolic resin, wherein said photosensitive composition becomes more oleophilic in exposure to light.

20. The photosensitive composition of claim 19 wherein the photosensitizing agent is iodoform.

21. The photosensitive composition of claim 1 wherein the photosensitizing compound (3) is coated on the association product of the ethylene oxide polymer (1) and phenolic resin (2).

22. The photosensitive composition of claim 1 wherein the photosensitizer (3) is incorporated into the composition.

No references cited.

NORMAN G. TORCHIN, *Primary Examiner.*